United States Patent [19]

De Lorenzo

[11] 4,188,978
[45] Feb. 19, 1980

[54] VALVE MECHANISM
[75] Inventor: Bruce L. De Lorenzo, Clifton, N.J.
[73] Assignee: Plasto-Matic Valves, Inc., Totowa, N.J.
[21] Appl. No.: 660,904
[22] Filed: Feb. 24, 1976

Related U.S. Application Data

[63] Continuation of Ser. No. 309,729, Nov. 27, 1972, abandoned.
[51] Int. Cl.$^2$ .............................................. F16K 15/14
[52] U.S. Cl. .................................................. 137/859
[58] Field of Search ...................... 137/496, 515.5, 859; 251/61.1, 331

[56] References Cited

U.S. PATENT DOCUMENTS

| | | | |
|---|---|---|---|
| 2,462,189 | 2/1949 | Hess ................................... | 137/496 |
| 2,497,906 | 2/1950 | Peters et al. ......................... | 137/496 |
| 2,854,996 | 10/1958 | Hughes .............................. | 137/859 X |
| 3,601,155 | 8/1971 | Brown ................................. | 137/625.66 |

FOREIGN PATENT DOCUMENTS

| | | | |
|---|---|---|---|
| 506043 | 9/1954 | Canada ..................................... | 251/61.1 |
| 690897 | 4/1953 | United Kingdom ..................... | 137/496 |

*Primary Examiner*—Robert G. Nilson

[57] ABSTRACT

This invention relates to a valve mechanism of a variety of uses. In one use the valve positively seals a line through which fluid flows against reverse or backflow of the fluids in any position in which the valve is disposed. In another use the valve mechanism functions as a vacuum breaker. In still another use it functions as a foot valve. The same valve structure is utilized in all of the aforesaid functions. Generally, the valve structure has a housing comprising an inlet member and an outlet member which are joined together. A flexible diaphragm is secured between the inlet and outlet members. One end of the inlet member is provided with a shoulder or flange adjacent the flexible diaphragm. One end of the outlet member is provided with a valve support seat adjacent the flexible diaphragm. The flexible diaphragm has apertures or orifices interiorly of its perimeter and a solid central portion. Under pressures exerted from the inlet side or the outlet side the diaphragm flexes from a position wherein its central portion abuts the valve support seat and the orifices are exposed for the flow of liquids to the outlet side to a position wherein the orifices are in proximity to the shoulder or flange and the central portion of the diaphragm seals the passage from the inlet member.

9 Claims, 5 Drawing Figures

VALVE MECHANISM

This is a continuation of application Ser. No. 309,729 filed on Nov. 27, 1972, now abandoned.

BACKGROUND OF THE INVENTION

Many and varied types of valving mechanisms have been heretofore proposed for sealing a line through which fluid flows against the reverse flow of the fluids. However, such valves are not usable in all planes in which they are disposed, such as, horizontal, vertical or angular planes. Furthermore, such valves are not self centering and require guides or hinges for centering purposes. At times despite the presence of such guides and hinges, the valve does not attain the identical sealing location in each operation. Many such valves are noisy in operation and are of such construction that particulates of solid material accumulate on the sealing surface.

In addition other valve mechanisms are not adapted to function for other purposes such as a vacuum breaker or a foot valve.

SUMMARY OF THE INVENTION

The present invention provides a valving mechanism comprising a flexible diagram of plastic, rubber or other suitable material which is disposed in the line through which fluid flows. A coupling between the inlet and outlet sides of the line usually carries the flexible diaphragm. The outlet side of the coupling is provided with a valve support seat. The seal or diaphragm has apertures or orifices interiorly of its perimeter and relatively solid material in the central portion thereof.

When the valve is in its open position the fluid flows from the inlet side to the outlet side through the orifices in the diaphragm, at the time the solid center portion abuts the valve support seat in the outlet side. However, under reverse or backflow conditions the diaphragm flexes to a position where the central portion moves from the valve support seat and closes the passage in the fluid inlet side of the line. In this position the apertures or orifices in the diaphragm are in proximity to a flange or shoulder adjacent to the opening in the fluid inlet side of the line. The line is thereby sealed and no fluid can escape to the outlet side of the line nor can the reverse flow enter the inlet until the conditions causing the reverse flow are remedied.

In addition, the same valve mechanism according to the present invention, has other functions and may be used as a vacuum breaker and as a foot valve.

In its function as a vacuum breaker the diaphragm is so constructed and shaped that it normally assumes the closed position in which the orifices are in proximity to the shoulder or flange on the inlet side of the valve. In this position, in the absence of a vacuum in the line, the central portion of the diaphragm seals the line against air intake. In the event that a vacuum condition exists in the line the diaphragm is flexed so that the central portion moves away from the air intake passage and the orifices are displaced to the outlet side of the line. Air is thereby permitted to pass into the line breaking the vacuum.

In the function of the valving mechanism as a foot valve, the diaphragm is also so constructed and shaped that it normally assumes the closed position in which the orifices are in proximity to the shoulder or flange on the fluid inlet side of the valve. A remotely disposed pump which pumps the fluid through the line, however, causes the diaphragm to flex away from the inlet and the shoulder or flange. The orifices are therefore disposed adjacent to the outlet side of the line under normal operating conditions when the pump is working. However should the pump cease to function the pressure of the fluid in the line causes the diaphragm to return to the position wherein it seals the passage from the inlet. Such action prevents the fluid from seeking its own level and the fluid is, instead, maintained in the line. Thereafter when the pump again is operatable it is not dry and there is no damage to the pump when it is again started.

It is therefore, an object of the invention to provide a valve mechanism which may be efficiently utilized in any horizontal, vertical and angular plane, i.e. in any position of spatial orientation of the housing.

Another object of the invention is to provide a valve mechanism which has a self centering seal assuring a bubble-tight sealing arrangement.

Still another object of the invention is to provide a valve mechanism which attains the same sealing location in each operation even after protracted periods of use.

A further object of the invention is to provide a valve mechanism which is self cleaning and silent in operation.

A feature of the invention is the provision of the valve mechanism which may also be used as a vacuum breaker.

Another feature of the invention is the provision of a check valve which may additionally be used as a foot valve.

Other objects and features of the invention are shown in the following specification in conjunction with the accompanying drawings in which:

GENERAL DESCRIPTION OF THE INVENTION

Figure 1:
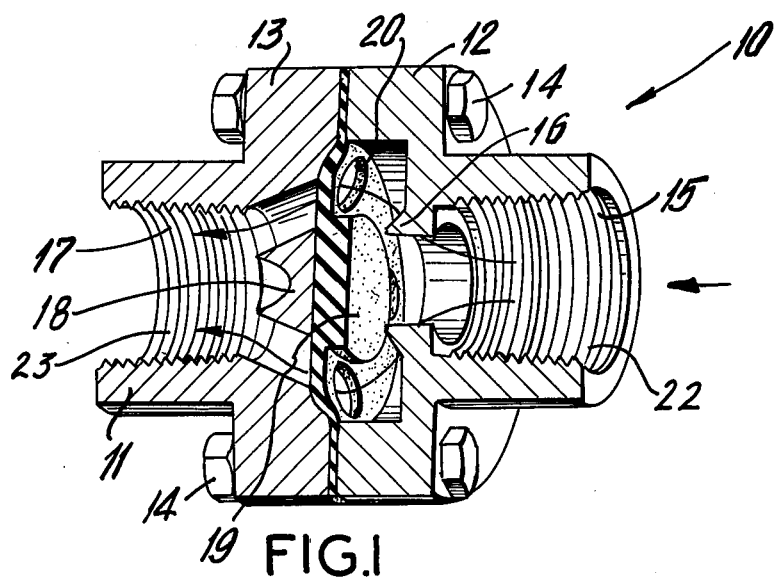
FIG. 1 is a sectional view of the check valve in the position when fluid flows normally through the line.
Figure 2:
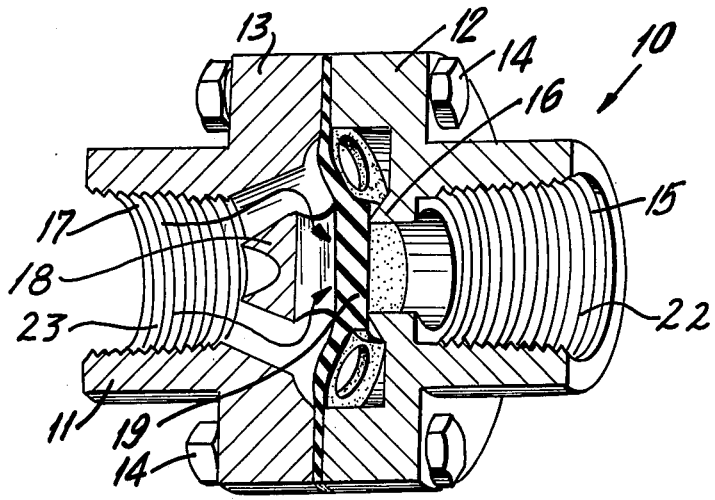
FIG. 2 is a sectional view of the check valve in the position when the fluid is in reverse-flow.
Figure 3:
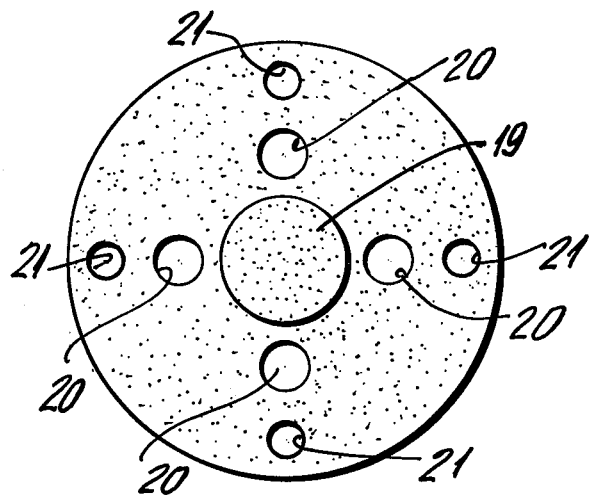
FIG. 3 is a top view of the flexible diaphragm of the check valve.

Referring to the drawings as shown in FIGS. 1-3, the check valve 10 comprises a housing in the form of a coupling member 11 through which fluid usually flows in the direction of the arrows shown in FIG. 1. The housing comprises two pieces 12 and 13 of metal or any other suitable material which are secured together by bolts 14. The inlet portion 15 of the coupling has a shoulder or flange 16 at one end. The outlet portion 17 of the coupling is provided with a valve support seat 18.

According to the present invention sealing means preferably in the form of a flexible diaphragm 19 made of rubber, plastic or other suitable material is located, as shown, between the inlet 15 and outlet 17 portions of the coupling 11.

The unique and novel flexible diaphragm comprises a disc which is provided with apertures or orifices 20 interiorly of the perimeter of the diaphragm. The central portion of the unitary diaphragm is of flat solid material, preferably somewhat uniformly thicker than the material around the orifices.

The diaphragm is also provided with openings 21 to accommodate the bolts 14 which maintain the diaphragm in position between the pieces 12 and 13 i.e. in an intermediate reference plane substantially transverse of the inlet and outlet passages in the housing or coupling 11. The openings 21 are not exposed when the valve is assembled.

In operation, the fluid normally flows through the valve coupling 11 in the direction of the arrows in FIG. 1. This flow of fluid causes the flexible diaphragm to remain located in the position on one side of the intermediate reference plane when the central portion of the diaphragm abuts the valve support seat 18 and the orifices 20 are located over the passageway in the outlet portion 17 of the coupling 11. Thus, fluid will flow from the passage of the inlet portion 15 through the orifices and out through the passageway in the outlet 17. The orifices are so dimensioned that they can accommodate a volume of a fluid passing therethrough equal to the volume of fluid flowing through the inlet passage. Therefore, there is no back-up of fluid passing through the line. In the event a condition arises which causes a reverse or backflow of liquid in the line it is essential that the valve seal off the inlet passage to prevent such reverse flow. With the present invention, when the reverse flow conditions arise the pressure exerted against the diaphragm flexes it away from the valve support seat into the position on the other side of the intermediate reference plane shown in FIG. 2 in which the orifices 20 are disposed adjacent to the shoulder or flange 16 in the inlet 15. The central portion of the diaphragm thus independently flexes through the intermediate reference plane, i.e. while remaining fixed against lateral movement by the bolts 14, to abut and seal the passageway from the inlet 15. By reason of the construction of the diaphragm this is completed without noise or chatter. In each such operation the seal is self centering and relocated at the exact position attained in each prior operation as the diaphragm is maintained against movement in a lateral direction by the bolts 14 which pass through the openings in the diaphragm 19. The housing or coupling 11 may be provided with threads 22 and 23 for attachment to the line.

Figure 4:
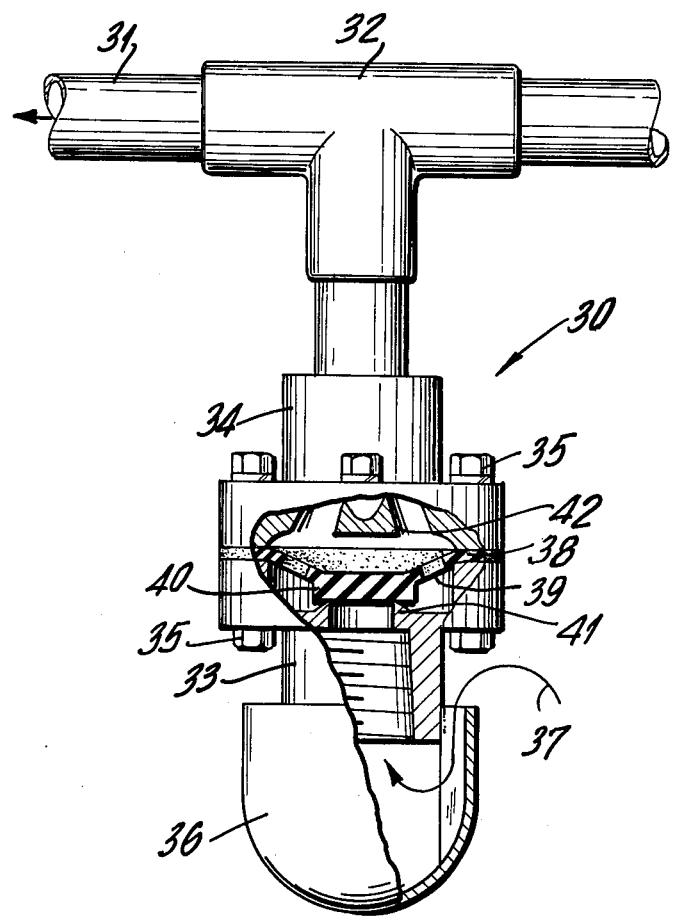
FIG. 4 is a sectional view of the check valve used as a vacuum breaker.

As shown in FIG. 4 the valving mechanism 30 may be utilized as a vacuum breaker. In this form the fluid flows through a line 31 in the direction of the arrows shown in FIG. 4. A suitable coupling 32 is connected between the inlet and outlet of the pipeline and supports the valving mechanism which, while shown perpendicular to the line, may of course, assume any other suitable position. In this construction the valving mechanism 30 comprises an inlet member 33 and an outlet member 34 which are joined together by bolts 35. An air chamber or cup 36 is attached by any suitable means to the base of the inlet member. A passage 37 is provided between the cup 36 and the inlet member 33 to permit air to flow into the cup and thereafter into the inlet member 33. A flexible diaphragm 38 is secured between the inlet and outlet members 33 and 34.

According to the present invention, the diaphragm 38 is provided with orifices 39 interiorly of its perimeter and a central portion 40 of flat solid material. One end of the inlet is provided with a shoulder or flange 41 and one end of the outlet is provided with a valve support seat 42. The diaphragm 38 is so constructed by molding or similar operation that it normally maintains a position in which the orifices 39 are adjacent the shoulder or flange 41 and the solid central portion 42 seals the passage from the inlet 33. The diaphragm 38 is adapted to flex into a position wherein the orifices 39 are adjacent the passage in the outlet member 34 and the central portion 40 abuts the valve support seat 42.

In operation the valve mechanism comprises a vacuum breaker and is normally disposed in position where the orifices 39 are adjacent the shoulder or flange 41 and the central portion 40 seals off the passage in the inlet member 33 as fluid passes through the pipeline 31. When a vacuum is created in the line, however, the diaphragm, under the reverse or reduced pressure of the vacuum, will flex moving the diaphragm so that the orifices are adjacent the passage in the outlet member 34 and the central portion 40 abuts the valve support seat 42. Air flowing through the cup 36 and into the inlet 33 is free to pass through the entire valve mechanism 30 into the line 31 breaking the vacuum whenever it occurs in a completely efficient manner. All of the features of self centering and identical relocation of the valve mechanism are also present in this function of the valve mechanism.

Figure 5:
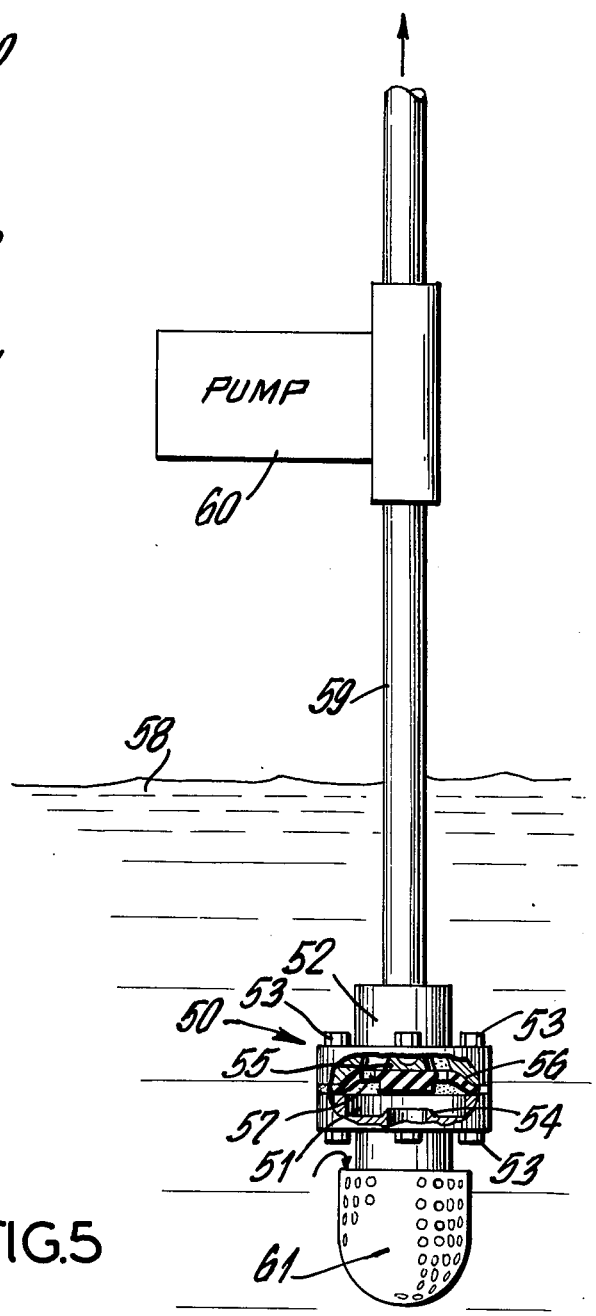
FIG. 5 is a sectional view of the valve of the present invention used as a foot valve.

As shown in FIG. 5, the versatile and adaptable valving mechanism of the present invention may be used as a foot valve. The valve mechanism 50 comprises an inlet member 51 and an outlet member 52 which are joined together by bolts 53 or any other suitable means. The inlet member has a shoulder or flange 54 at one end thereof. The outlet member 52 is provided with a valve support seat 55 at one end thereof. A flexible diaphragm 56 having orifices 57 interiorly of its periphery is secured between the inlet and outlet members 51 and 52. As shown, the valve mechanism 50 is immersed in a fluid bed 58. A pipeline 59 extends from the outlet member 52 to a pump 60 and the fluid is pumped from the fluid bed to any desired remote destination flowing in the direction of the arrows shown in FIG. 5.

If desired, a strainer or filter 61 may be attached to the inlet member 51 to filter the fluids which pass through the valve mechanism and the pipeline.

In operation, the valve mechanism 50 is immersed in a fluid bed 58. The diaphragm is so molded or otherwise constructed as to normally be located substantially transverse to the inlet and outlet members with the orifices 57 adjacent the shoulder or flange 54. When the pump 60 is activated the diaphragm 56 flexes and is pulled upwardly to the position illustrated in FIG. 5 wherein the orifices 57 are adjacent the passage in the outlet member 52 with the central portion 58 abutting the valve support seat 55. The fluid from the bed 58 is drawn upwardly through the filter 61, the inlet member 51, the orifices 57 and the outlet member 52 to the pump 60.

The valve mechanism of the present invention with its versatility resolves a long standing problem which is encountered when the pump becomes inoperative for any reason. The problem exists because normally water seeks its own level and drains below the pump. Thereafter it is difficult, if not impossible, to restart the pump without damage. However, according to the present invention, should the pump fail, the diaphragm 56 will no longer be flexed upwardly and by reason of the fact, and because of the pressure exerted by the water remaining in the line, the diaphragm will assume its normal position sealing off the passage in the inlet member 51. The water is then maintained in the line at least to the pump level and the pump may be started without causing any damage thereto.

Thus, the valve mechanism and diaphragm may be effeciently utilized in any horizontal, vertical and angular plane, i.e. in any position of spatial orientation of the housing.

The valve mechanism of the present invention has been described in detail to facilitate an understanding thereof. It will be understood, however, that variations and modifications may be made without departing from the spirit of the invention as defined in the appended claims.

I claim:
1. Valve mechanism comprising:
   a housing having an inlet member and an outlet member between which fluids are adapted to pass,
   a self-centering flexible diaphragm disposed within said housing and operatively peripherally fixedly mounted and maintained against lateral movement between said inlet and outlet members and extending substantially transverse to said members in an intermediate reference plane,
   said diaphragm having orifices interiorly of its perimeter to permit the passage of fluid from the inlet member to the outlet member and a central solid sealing portion,
   a valve support seat in the outlet member adjacent to yet spaced from one side of the intermediate reference plane for abutting the central portion of the diaphragm during normal flow of the fluids through the housing and a sealable passage in the inlet member adjacent to yet spaced from the other side of the intermediate reference plane for abutting the central portion of the diaphragm to prevent the flow of fluid through the housing,
   said diaphragm being peripherally arranged for independent flexible self-movement in any position of spatial orientation of the housing between an opening position wherein the central portion thereof abuts the valve support seat on said one side of the intermediate reference plane and a closing position wherein the central portion thereof abuts the sealable passage on said other side of the intermediate reference plane, and said diaphragm being normally independently self-disposed in one of said position for independently flexibly self-moving through the intermediate reference plane and while being maintained against lateral movement to the other of said positions in any said position of spatial orientation upon a change in the flow condition through housing.

2. Valve mechanism according to claim 1 wherein said diaphragm is a unitary diaphragm.

3. Valve mechanism according to claim 1 wherein a peripheral flange is provided around each of said inlet and outlet members having apertures therethrough for the accommodation of securing means, and apertures are disposed around the periphery of said diaphragm for location between the apertures disposed in the peripheral flanges of the inlet and outlet members thereby to mount operatively peripherally fixedly and maintain against lateral movement said diaphragm transversely between said inlet and outlet members.

4. Valve mechanism according to claim 1 wherein the central portion of the diaphragm is a central flat solid sealing portion of increased uniform thickness compared to the thickness of the remainder of the diaphragm.

5. Valve mechanism according to claim 1 wherein the sealable passage in the inlet member includes a sealable shoulder defining the inward terminus of the passage for abutting the central portion of the diaphragm to prevent the flow of fluid through the housing.

6. Valve according to claim 1 wherein the diaphragm orifices are so dimensioned that they can accommodate a volume of fluid passing therethrough substantially equal to the volume of fluid flowing through the inlet passage.

7. Valve mechanism comprising:
   a housing having an inlet member and an outlet member between which fluids are adapted to pass,
   a self-centering unitary flexible diaphragm disposed within said housing and operatively peripherally fixedly mounted and maintained against lateral movement between said inlet and outlet members and extending substantially transverse to said members in an intermediate reference plane,
   a peripheral flange provided around each of said inlet and outlet members having apertures therethrough for the accommodation of securing means, and apertures disposed around the periphery of said diaphragm for location between the apertures disposed in the peripheral flanges of the inlet and outlet members thereby to mount operatively peripherally fixedly and maintain against lateral movement said diaphragm transversely between said inlets and outlet members in the intermediate reference plane,
   said unitary diaphragm having orifices interiorly of its perimeter to permit the passage of fluid from the inlet member to the outlet member and a central flat solid sealing portion of increased uniform thickness compared to the thickness of the remainder of the diaphragm,
   a valve support seat in the outlet member adjacent to yet spaced from one side of the intermediate reference plane for abutting the central portion of the diaphragm during normal flow of the fluids through the housing and a sealable passage in the inlet member adjacent to yet spaced from the other side of the intermediate reference plane for abutting the central portion of the diaphragm to prevent the flow of fluid through the housing,
   said diaphragm being peripherally arranged for independent flexible self-movement in any position of spatial orientation of the housing between an opening position wherein the central portion thereof abuts the valve support seat on said one side of the intermediate reference plane and a closing position wherein the central portion thereof abuts the sealable passage on said other side of the intermediate reference plane, and said diaphragm being normally independently self-disposed in one of said positions for independently flexibly self-moving through the intermediate reference plane and while being maintained against lateral movement to the other of said positions in any said position of spatial orientation upon a change in the flow condition through the housing.

8. Valve mechanism according to claim 7 wherein the sealable passage in the inlet member includes a sealable shoulder defining the inward terminus of the passage for abutting the central portion of the diaphragm to prevent the flow of fluid through the housing.

9. Valve mechanism according to claim 7 wherein the diaphragm orifices are so dimensioned that they can accommodate a volume of fluid passing therethrough substantially equal to the volume of fluid flowing through the inlet passage.

* * * * *